US007011291B2

(12) United States Patent
Miklo et al.

(10) Patent No.: US 7,011,291 B2
(45) Date of Patent: Mar. 14, 2006

(54) HANDLE FOR VALVES

(75) Inventors: Jürgen Miklo, Thayngen (CH); Walter Schäpper, Buchs (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 43 days.

(21) Appl. No.: 10/824,870

(22) Filed: Apr. 14, 2004

(65) Prior Publication Data

US 2004/0222396 A1 Nov. 11, 2004

(30) Foreign Application Priority Data

Apr. 16, 2003 (DE) ............................... 103 17 808

(51) Int. Cl.
*F16K 35/00* (2006.01)

(52) U.S. Cl. ....................... 251/109; 251/103; 137/382

(58) Field of Classification Search ................... 251/95, 251/101, 102, 103, 107, 109, 257, 315.01; 137/377, 382

See application file for complete search history.

(56) References Cited

U.S. PATENT DOCUMENTS

| 3,397,863 A | * | 8/1968 | Bell | 251/285 |
| 5,326,075 A | * | 7/1994 | Goff | 251/285 |
| 6,260,819 B1 | * | 7/2001 | Ovsepyan | 251/96 |

FOREIGN PATENT DOCUMENTS

| DE | 43 36 008 | 4/1994 |
| EP | 0 773 395 | 5/1997 |

* cited by examiner

*Primary Examiner*—Edward K. Look
*Assistant Examiner*—John K. Fristoe, Jr.
(74) *Attorney, Agent, or Firm*—Bachman & LaPointe, P.C.

(57) ABSTRACT

A handle (2) as actuating device for valves (1) is proposed, comprising a fastening head (10) for fastening to a spindle (7) of the valve (1) and an actuating arm (11) for rotatably actuating the spindle, the spindle (7) being arranged in a valve housing (5) so as to be rotatable about the axis of rotation of a sealing part, the actuating arm (11) being arranged to be movable perpendicularly to the axis of the spindle (7) from a closed position into an open position of the valve (1). The actuating arm (11) has means (14) for preventing the actuation of the handle (2), the fastening head (10) has a fastening means (21) for fastening the handle (2) to the valve spindle (7), and the handle (2) has a sealing plate (15) for sealing the fastening means (21).

9 Claims, 4 Drawing Sheets

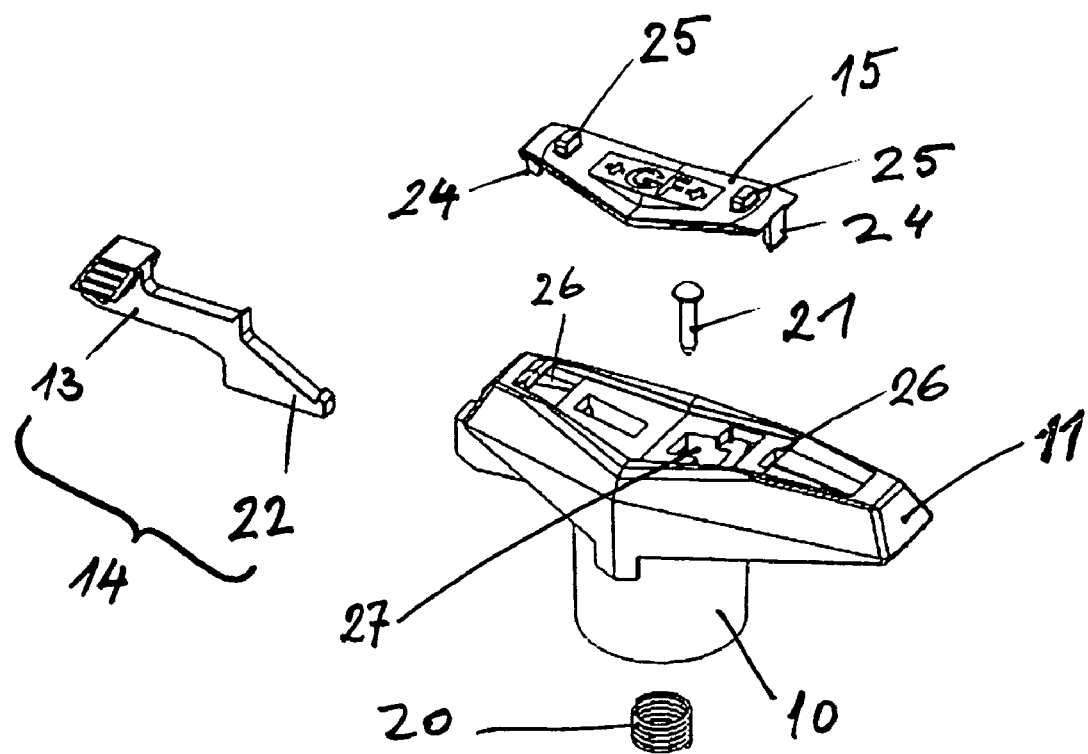
Fig. 2
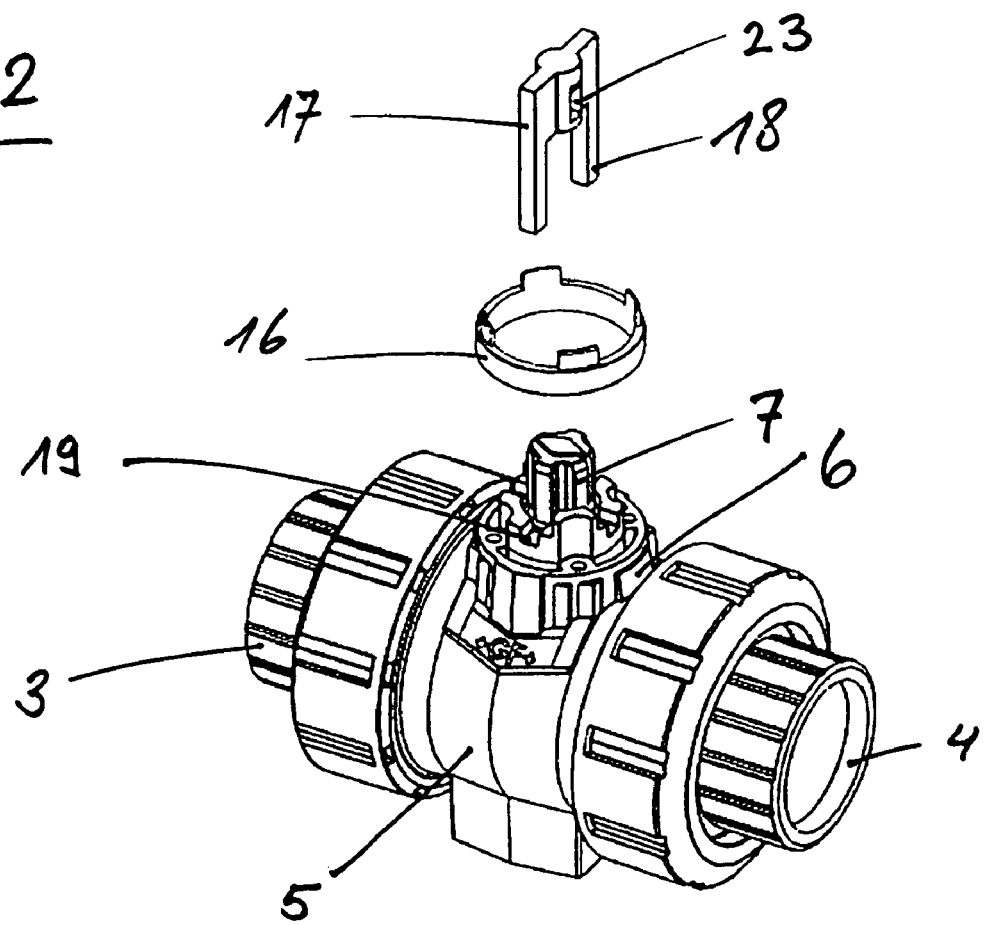

HANDLE FOR VALVES

BACKGROUND OF THE INVENTION

The invention relates to a handle as actuating device for valves, comprising a fastening head for fastening to a spindle of the valve and an actuating arm for rotatably actuating the spindle, the spindle being arranged in a valve housing so as to be rotatable about the axis of rotation of a sealing part, and the actuating arm being arranged to be movable perpendicularly to the axis of the spindle from a closed position into an open position of the valve.

Valves which can be locked in a defined position are used in pipeline systems. In this case, it is often necessary to protect the valve position against unauthorized or unintentional actuation.

DE 43 36 008 A1 discloses a handle of the generic type for a valve. The angular movement of the handle is limited by pins which strike stops on the valve housing in the open and closed states of the valve. The pins prevent an unauthorized or unintentional angular movement of the handle. The pins, which are arranged in the handle, are pressed downward against the valve housing by locking and unlocking levers which are connected to a spring. The handle is detachably pushed onto the valve spindle. The handle can thus be pulled off from the valve spindle at any time without a tool.

EP 773 395 A1 discloses a further handle of the generic type. The handle essentially comprises a fastening head which can be fastened to a spindle of a valve and an actuating arm which is integrally connected to the fastening head. The actuating arm is arranged to run perpendicularly to the axis of the valve spindle. A flexible latch is arranged on the underside of the actuating arm. The flexible end of the latch catches in the unloaded state in an exactly matching latch receptacle which is recessed on the top side of the valve housing. In this rest position, the latch can be locked against unintentional movement by means of a padlock. The latch therefore cannot be removed from the latch receptacle, the actuating arm cannot be actuated, and the valve spindle cannot be rotated. The fastening head is screwed to a screw at the free end of the valve spindle by means of a nut capable of being embedded. The nut and the screw are located in a recess in the actuating head. The connection between valve spindle and handle can be released at any time.

It is an object of the invention to provide a handle for valves which prevents an unauthorized or unintentional actuation of the valve for as long as possible and as effectively as possible.

SUMMARY OF THE INVENTION

The foregoing object is achieved by the present invention wherein a handle is provided as an actuating device for valves, comprising a fastening head for fastening to a spindle of the valve and an actuating arm for rotatably actuating the spindle, the spindle being arranged in a valve housing so as to be rotatable about the axis of rotation of a sealing part, the actuating arm being arranged to be movable perpendicularly to the axis of the spindle from a closed position into an open position of the valve, the actuating arm having means for preventing the actuation of the handle, the fastening head having a fastening means for fastening the handle to the valve spindle, and the handle having a sealing plate for sealing the fastening means.

It is advantageous that no further tools are required for fitting and removing the valve. This is achieved by the sealing plate being formed from a plastic material having substantially higher strength than the plastic material of the handle. This is also achieved by the sealing plate having a second pair of projections which are suitably designed for fitting and removing a screw-in ring for fastening the sealing part in the valve housing of the ball valve.

BRIEF DESCRIPTION OF THE DRAWINGS

An exemplary embodiment of the invention is described with reference to the figures. In the drawing:

FIG. 2 shows a perspective view of the valve of FIG. 1 in an exploded illustration.

DETAILED DESCRIPTION

Figure 1:
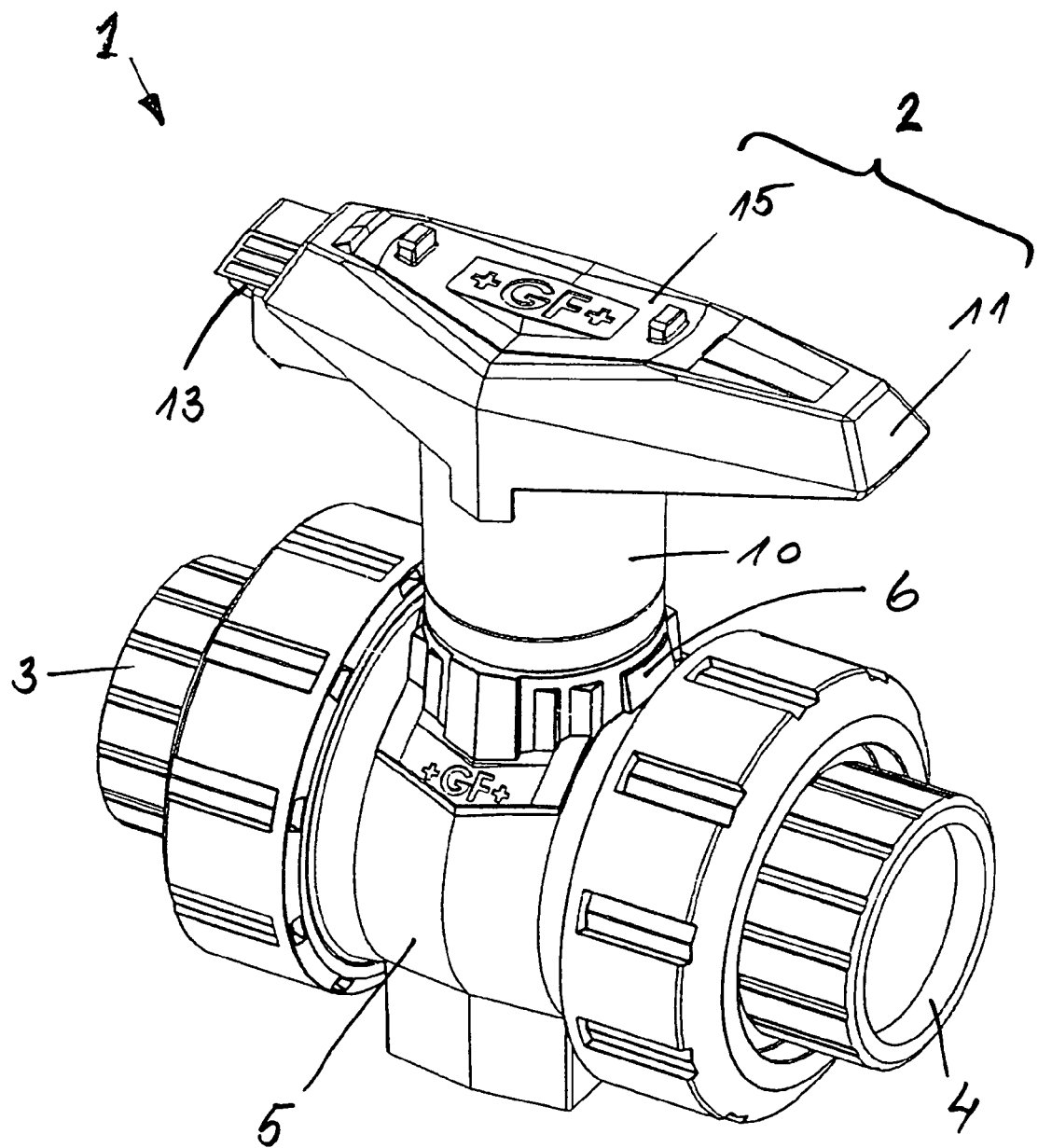
FIG. 1 shows a perspective view of a handle according to the invention as an actuating device for a valve, in the assembled state.

A ball valve 1 having a handle 2 and having two pipeline connections 3, 4 is shown in perspective in FIG. 1. A collar region 6 is formed above the valve housing 5 of the ball valve 1 parallel to the pipeline axis. A valve spindle 7 leads through the collar region 6. The valve spindle 7 is connected on the one hand to the sealing part, here the ball plug, of the ball valve 1 and on the other hand to the handle 2 for actuating the ball valve 1. The handle 2 essentially comprises a fastening head 10, an actuating arm 11, and a lever arm 13 as that part of a means 14 for preventing the actuation of the handle 2 which is visible from outside. The handle 2 has a sealing plate 15 on the top side.

The same ball valve 1 as in FIG. 1 is shown in an exploded illustration in FIG. 2. The same reference numerals relate to the same elements of the ball valve 1. All the individual parts of the handle 2 can be seen in FIG. 2. A guide ring 16 is arranged between the collar region 6 of the ball valve 1 and the fastening head 10 of the handle 2. The guide ring 16 serves to protect against the ingress of dirt towards the interior of the ball valve 1. A latch part 17 having two catch fingers 18 is arranged in the fastening head 10. The catch fingers 18 engage in matching recessed portions 19 in the collar region 6 of the valve housing 5.

By the spring force of a spring 20, which is likewise arranged in the fastening head 10 between the latch part 17 and the actuating arm 11, the latch part 17 is pressed downward into the recessed portions 19 when the handle 2 is brought into the desired position in which the actuation of the valve 1 is to be prevented. The valve position or positions which is/are desired for locking the valve is/are chosen according to the depth and positioning of the recessed portions 19 in the collar region 6. The fastening head 10 is fastened to the spindle 7 by means of the fastening means 21. In FIG. 2, the fastening means is a special screw 21 which can simply be screwed tight but can only be unscrewed again with a special tool.

The front section 22 of the lever arm 13, which in this case is designed as a pushbutton, engages in an aperture 23 of the latch part 17. By the movement of the lever arm with respect to the handle 2, the latch part 17 can be lifted against the spring force of the spring 20, and the handle 2 can be actuated in this position. The lever arm 13 can be locked against the lever movement in a known manner, for example with a padlock. The front section 22 of the pushbutton 13 can be extended in the longitudinal direction of the handle 2 to such an extent that, when pushbutton 13 is engaged, the special screw 21 is covered by the front section 22. The special screw 21 can therefore no longer be actuated from above, that is to say in the direction of the spindle 7. In this way, further protection against unintentional actuation of the valve 1 is achieved.

The sealing plate 15 has a first pair of projections 24 on the underside and a second pair of further projections 25 on the top side. The top side of the handle 2 has recesses 26, in which the first projections 24 engage when the valve 1 is assembled. Also located below the sealing plate 15 in the handle is an aperture 27, through which the special screw 21 can be inserted and fastened. The sealing plate 15 and the other parts of the ball valve 1 are as far as possible formed from plastic material.

Only the sealing plate 15 is made of a plastic material that has substantially higher strength than the rest of the plastic material. This means that the sealing plate 15 is held in place in the recesses 26 in an especially effective manner. This also means that the sealing plate 15, with the projections 25, can be used for fitting the ball plug in and removing it from the valve housing 5. The ball plug is held in place in the valve housing 5 in a known manner by means of screw-in rings. To this end, the screw-in rings have radially arranged recesses which correspond in shape and positioning to the shape and positioning of the projections 25. The sealing plate 15 is produced, for example, from a glass-fiber-reinforced polypropylene molding compound (PP-GFK), and the valve 1 itself is produced from polypropylene molding compound (PP).

Figure 3:
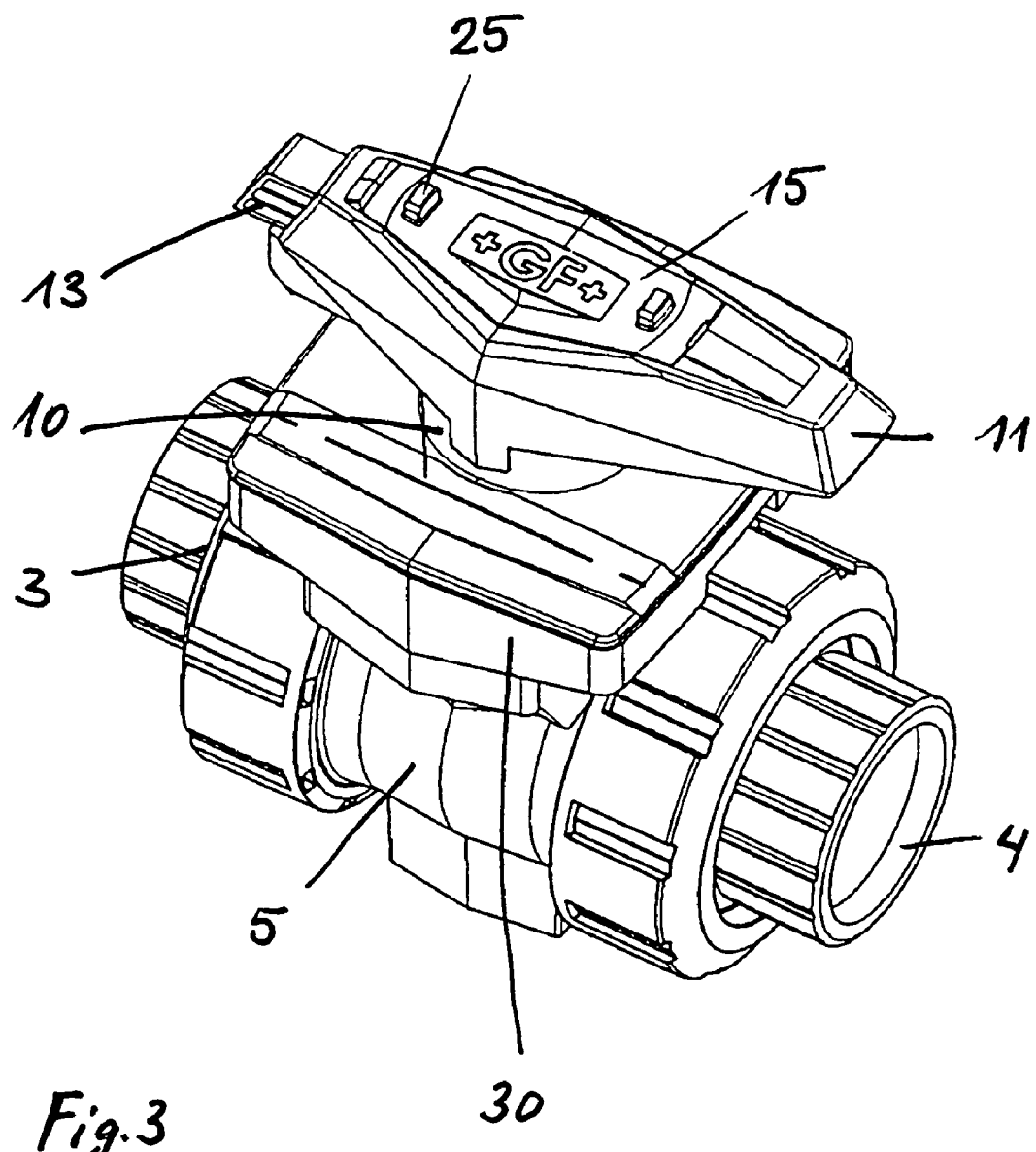
FIG. 3 shows a perspective view of a further exemplary embodiment of the handle for a valve with a multifunction module.
Figure 4:
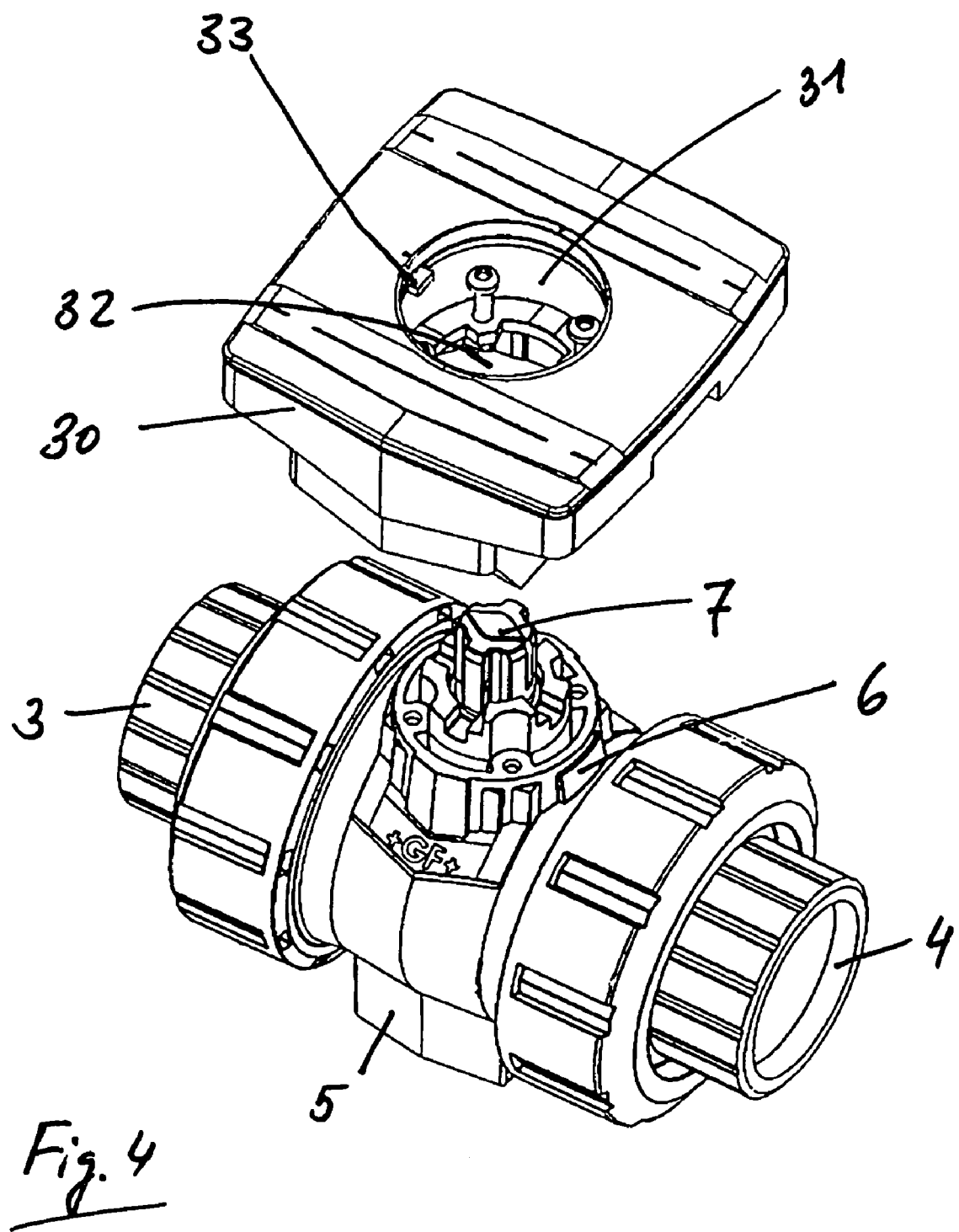
FIG. 4 shows a perspective view of the valve of FIG. 3 in an exploded illustration.

A second exemplary embodiment of a ball valve 1 having the same handle 2 as in FIGS. 1 and 2 is shown in FIGS. 3 and 4. The handle 2 with the fastening head 10, the actuating arm 11, the lever arm 13 and the sealing plate 15 is identical to the handle from FIGS. 1 and 2. A "multifunction housing" 30 is depicted in the collar region 6 of the ball valve 1. As can be seen in FIG. 4, the multifunction housing 30 is arranged over the collar region 6 in a precisely fitting manner. On the top side, the multifunction housing 30 has an opening 31, into which the actuating head 10 of the handle 2 can be inserted. A further opening 32 which exactly matches the collar region 6 of the valve 2 can be seen on the bottom side of the multifunction housing 30.

A driving lug 33 can be seen in the multifunction housing 30. This lug 33 is formed on the inner circumference of a driving ring. The lug 33 of the driving ring fits into a recess on the outer circumference of the actuating head 10 and is driven along during the rotary movement of the handle 2. The driving ring has further lugs which cannot be seen here and which actuate the microswitches or activate other signal transmitters. The fitting of the multifunction housing 30 achieves a situation in which the valve position can be made electrically or electronically detectable even in the case of a manually operated valve.

The handle 2 proposed here, as actuating member for the ball valve 1, can be locked in any desired valve position, can be locked with a locking device, such as a padlock for example, has at least one recess on the actuating head 10 for the driving ring for detecting the valve position, can be screwed to the spindle 7 of the valve 1 by means of a special screw 21, and comprises a sealing plate 15 which can be used both for sealing the special screw 7 and for fitting and removing the ball valve 1. Owing to the projections 25, the sealing plate 15 can also be used for fitting and removing a screw-in ring in the interior of the ball valve. The torque of the various elements of the ball valve 1 can be set with the sealing plate 15.

The invention claimed is:

1. A handle (2) for actuating a valve (1), comprising a fastening head (10) for fastening to a spindle (7) of the valve and an actuating arm (11) for rotatably actuating the spindle, the spindle (7) being arranged in a valve housing (5) so as to be rotatable about an axis of rotation of a sealing part, the actuating arm (11) being arranged to be movable perpendicularly to the axis of the spindle (7) from a closed position into an open position of the valve (1), wherein the actuating arm (11) has means (14) for preventing the actuation of the handle (2), wherein the fastening head (10) has a fastening means (21) for fastening the handle (2) to the valve spindle (7), and wherein the handle has a sealing plate (15) for sealing the fastening means (21), the sealing plate (15) is formed from a plastic material having substantially higher strength than the strength of the plastic material of the valve (1).

2. A handle (2) for actuating a valve (1), comprising a fastening head (10) for fastening to a spindle (7) of the valve and an actuating arm (11) for rotatably actuating the spindle, the spindle (7) being arranged in a valve housing (5) so as to be rotatable about an axis of rotation of a sealing part, the actuating arm (11) being arranged to be movable perpendicularly to the axis of the spindle (7) from a closed position into an open position of the valve (1), wherein the actuating arm (11) has means (14) for preventing the actuation of the handle (2), wherein the fastening head (10) has a fastening means (21) for fastening the handle (2) to the valve spindle (7), and wherein the handle has a sealing plate (15) for sealing the fastening means (21), wherein the sealing plate (15) is formed from a first plastic material and the valve (1) is formed from a further plastic material.

3. A handle (2) for actuating a valve (1), comprising a fastening head (10) for fastening to a spindle (7) of the valve and an actuating arm (11) for rotatably actuating the spindle, the spindle (7) being arranged in a valve housing (5) so as to be rotatable about an axis of rotation of a sealing part, the actuating arm (11) being arranged to be movable perpendicularly to the axis of the spindle (7) from a closed position into an open position of the valve (1), wherein the actuating arm (11) has means (14) for preventing the actuation of the handle (2), wherein the fastening head (10) has a fastening means (21) for fastening the handle (2) to the valve spindle (7), and wherein the handle has a sealing plate (15) for sealing the fastening means (21), wherein the sealing plate (15) has a first pair of catch projections (24) for catching in the handle (2) and a second pair of projections (25) which are suitably designed for fitting and removing the ball valve (1).

4. The handle as claimed in claim 1 or 3, wherein the sealing plate (15) is formed from a first plastic material.

5. The handle as claimed in claim 4, wherein the valve (1) is formed from a further plastic material.

6. The handle as claimed in claim 1, 2 or 3, wherein the valve is designed as a ball valve (1).

7. The handle as claimed in claim 2 or 3, wherein the sealing plate (15) is formed from a plastic material having substantially higher strength than the strength of the plastic material of the valve (1).

8. The handle as claimed in claim 1 or 2, wherein the sealing plate (15) has a first pair of catch projections (24) for catching in the handle (2).

9. The handle as claimed in claim 8, wherein the sealing plate (15) has a second pair of projections (25) which are suitably designed for fitting and removing the ball valve (1).

* * * * *